United States Patent
Nomura et al.

(10) Patent No.: US 11,544,660 B2
(45) Date of Patent: Jan. 3, 2023

(54) NON-TRANSITORY COMPUTER-READABLE STORAGE MEDIUM FOR STORING DELIVERY PLAN CREATION SUPPORT PROGRAM, DELIVERY PLAN CREATION SUPPORT METHOD, AND INFORMATION PROCESSING APPARATUS

(71) Applicant: FUJITSU LIMITED, Kawasaki (JP)

(72) Inventors: Kenji Nomura, Atsugi (JP); Hideshi Yamaguchi, Atsugi (JP); Hidetoshi Matsuoka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 18 days.

(21) Appl. No.: 17/165,990

(22) Filed: Feb. 3, 2021

(65) Prior Publication Data

US 2021/0334745 A1   Oct. 28, 2021

(30) Foreign Application Priority Data

Apr. 24, 2020   (JP) .............................. JP2020-077846

(51) Int. Cl.
*G06Q 10/08* (2012.01)
*G06Q 10/04* (2012.01)
(Continued)

(52) U.S. Cl.
CPC ....... *G06Q 10/0833* (2013.01); *G06Q 10/047* (2013.01); *G06Q 10/0832* (2013.01); *G06F 17/11* (2013.01); *G06Q 50/28* (2013.01)

(58) Field of Classification Search
CPC ............. G06Q 10/0833; G06Q 10/047; G06Q 10/0832; G06Q 10/0834; G06Q 10/0836;
(Continued)

(56) References Cited

U.S. PATENT DOCUMENTS

| | | | |
|---|---|---|---|
| 2003/0078802 A1* | 4/2003 | Yonezawa | G06Q 10/06375 705/338 |
| 2011/0047000 A1* | 2/2011 | Perry | G06Q 10/08 705/7.29 |
| 2021/0272065 A1* | 9/2021 | Sakakibara | G06Q 10/0838 |

FOREIGN PATENT DOCUMENTS

| | | |
|---|---|---|
| EP | 2254082 A1 | 11/2010 |
| JP | 2002-356232 A | 12/2002 |
| JP | 2005-263447 A | 9/2005 |

OTHER PUBLICATIONS

Liu, Jiyin et al. "Mixed truck delivery systems with both hub-and-spoke and direct shipment." Transportation Research Part E: Logistics and Transportation Review 39.4 (2003): 325-339. (Year: 2003).*

(Continued)

*Primary Examiner* — Jeff Zimmerman
*Assistant Examiner* — Brian A Tallman
(74) *Attorney, Agent, or Firm* — Fujitsu Patent Center

(57) ABSTRACT

A method includes: for each of a delivery source and each of plural delivery destinations to which goods are delivered, receiving distance information indicating a distance between points, delivery amount information indicating a total delivery amount of the goods to each of the plural delivery destinations, and maximum delivery amount information indicating a maximum delivery amount per delivery; calculating a first cost to deliver the goods for the total delivery amount from the delivery source to each of the plural delivery destinations while setting the maximum delivery amount indicated by the maximum delivery amount information; calculating a second cost to deliver the goods for the total delivery amount from the delivery source to each of the delivery destinations; executing selection processing for selecting a delivery destination by using the first cost and the second cost; and creating a delivery plan by using a result of the selection processing.

9 Claims, 15 Drawing Sheets

(51) Int. Cl.
 *G06Q 50/28* (2012.01)
 *G06F 17/11* (2006.01)
(58) Field of Classification Search
 CPC .. G06Q 50/28; G06Q 10/083; G01C 21/3461;
  G01C 21/3492; G01C 21/3605; G06F
  17/10–11
 USPC .................................................. 703/330–333
 See application file for complete search history.

(56) References Cited

OTHER PUBLICATIONS

Extended European Search Report dated Jun. 4, 2021 for corresponding European Patent Application No. 21153713.9, 8 pages.
European Office Action dated Jul. 26, 2022 for corresponding European Patent Application No. 21153713.9, 6 pages. *Please note US-2003/078802-A1 and EP-2254082-A1 cited herewith, were previously cited in an IDS filed on Aug. 31, 2021.*.

* cited by examiner

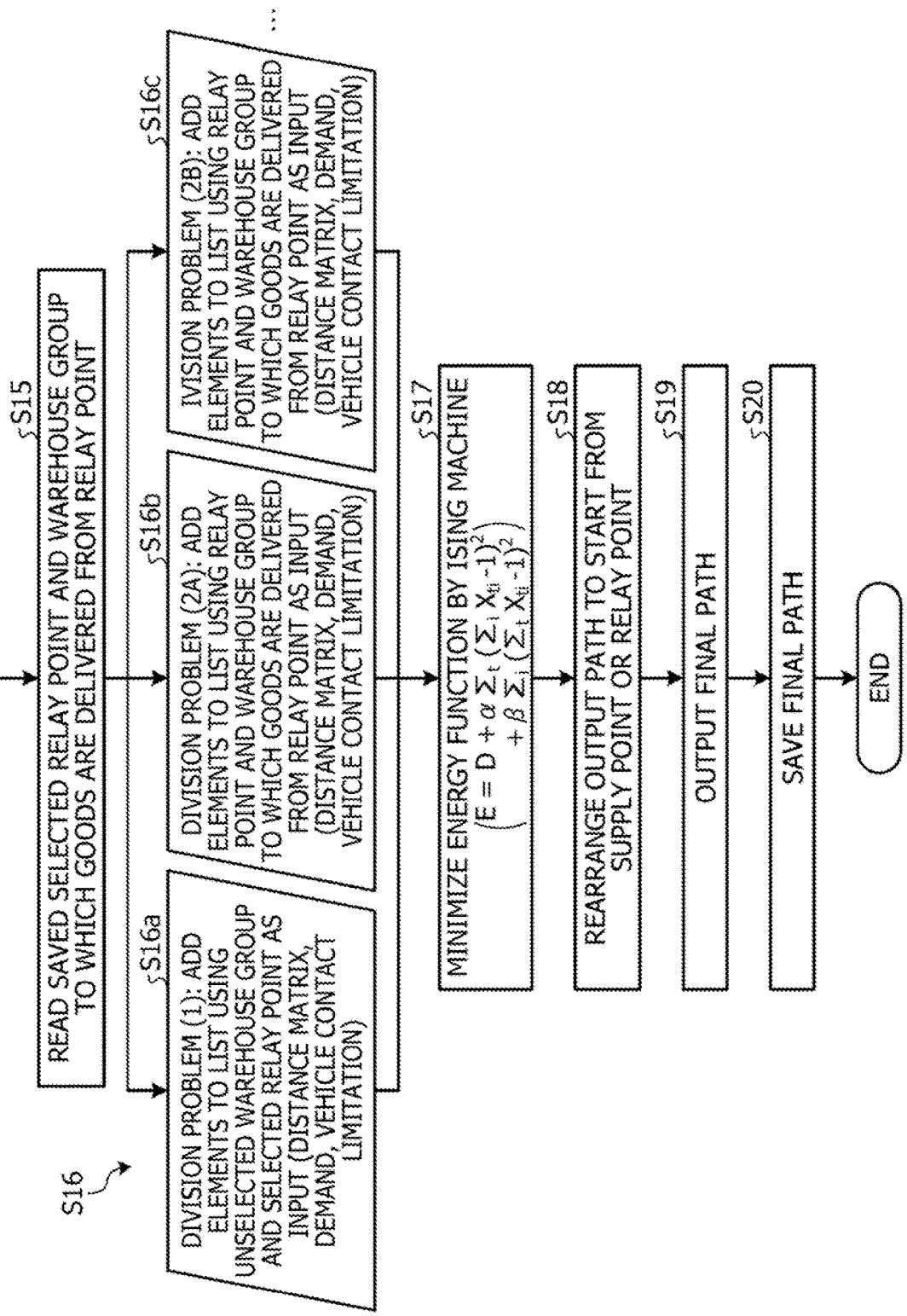

FIG. 4

- c=0.713733, RELAY POINT 6, DEMAND POINT 3,4,5
  .....
- c=0.708287, RELAY POINT 6, DEMAND POINT 3,4,5,7
  .....
- c=0.57592, RELAY POINT 6, DEMAND POINT 4,5,7
  .....
- c=0.572016, RELAY POINT 7, DEMAND POINT 3,4,5
  .....
  ...

FIG. 7A

| PLACE | SUPPLY POINT | DEMAND POINT 1 | DEMAND POINT 2 | DEMAND POINT 3 | DEMAND POINT 4 | DEMAND POINT 5 | DEMAND POINT 6 | DEMAND POINT 7 | DEMAND POINT 8 | DEMAND POINT 9 | DEMAND POINT 10 | DEMAND POINT 11 | DEMAND POINT 12 | DEMAND POINT 13 | DEMAND POINT 14 | DEMAND POINT 15 |
|---|---|---|---|---|---|---|---|---|---|---|---|---|---|---|---|---|
| SUPPLY POINT | 0.000 | 1.029 | 1.351 | 1.592 | 1.592 | 1.592 | 1.759 | 1.945 | 1.720 | 1.865 | 1.929 | 1.865 | 2.219 | 2.203 | 2.508 | 2.460 |
| DEMAND POINT 1 | 1.029 | 0.000 | 0.322 | 0.852 | 0.772 | 0.627 | 0.730 | 0.916 | 0.691 | 0.836 | 0.900 | 0.836 | 1.190 | 1.174 | 1.479 | 1.431 |
| DEMAND POINT 2 | 1.351 | 0.322 | 0.000 | 0.933 | 0.836 | 0.595 | 0.531 | 0.836 | 0.354 | 0.515 | 0.579 | 0.515 | 1.238 | 0.868 | 1.190 | 1.302 |
| DEMAND POINT 3 | 1.592 | 0.852 | 0.933 | 0.000 | 0.198 | 0.515 | 0.691 | 0.884 | 1.254 | 1.334 | 1.447 | 1.479 | 1.270 | 1.640 | 1.479 | 1.431 |
| DEMAND POINT 4 | 1.592 | 0.772 | 0.836 | 0.198 | 0.000 | 0.418 | 0.595 | 0.772 | 1.158 | 1.238 | 1.334 | 1.334 | 1.158 | 1.527 | 1.367 | 1.318 |
| DEMAND POINT 5 | 1.592 | 0.627 | 0.595 | 0.515 | 0.418 | 0.000 | 0.236 | 0.434 | 0.949 | 0.965 | 1.029 | 1.238 | 0.820 | 1.190 | 1.029 | 0.981 |
| DEMAND POINT 6 | 1.759 | 0.730 | 0.531 | 0.691 | 0.595 | 0.236 | 0.000 | 0.306 | 0.852 | 0.804 | 0.868 | 1.077 | 0.691 | 1.061 | 0.900 | 0.852 |
| DEMAND POINT 7 | 1.945 | 0.916 | 0.836 | 0.884 | 0.772 | 0.434 | 0.306 | 0.000 | 1.158 | 1.158 | 1.238 | 1.431 | 0.386 | 0.756 | 0.595 | 0.547 |
| DEMAND POINT 8 | 1.720 | 0.691 | 0.354 | 1.254 | 1.158 | 0.949 | 0.852 | 1.158 | 0.000 | 0.563 | 0.611 | 0.450 | 1.367 | 0.997 | 1.318 | 1.431 |
| DEMAND POINT 9 | 1.865 | 0.836 | 0.515 | 1.334 | 1.238 | 0.965 | 0.804 | 1.158 | 0.563 | 0.000 | 0.314 | 0.322 | 0.997 | 0.627 | 0.949 | 1.061 |
| DEMAND POINT 10 | 1.929 | 0.900 | 0.579 | 1.447 | 1.334 | 1.029 | 0.868 | 1.238 | 0.611 | 0.314 | 0.000 | 0.241 | 1.013 | 0.643 | 0.965 | 1.077 |
| DEMAND POINT 11 | 1.865 | 0.836 | 0.515 | 1.479 | 1.334 | 1.238 | 1.077 | 1.431 | 0.450 | 0.322 | 0.241 | 0.000 | 1.222 | 0.852 | 1.174 | 1.286 |
| DEMAND POINT 12 | 2.219 | 1.190 | 1.238 | 1.270 | 1.158 | 0.820 | 0.691 | 0.386 | 1.367 | 0.997 | 1.013 | 1.222 | 0.000 | 0.370 | 0.672 | 0.662 |
| DEMAND POINT 13 | 2.203 | 1.174 | 0.868 | 1.640 | 1.527 | 1.190 | 1.061 | 0.756 | 0.997 | 0.627 | 0.643 | 0.852 | 0.370 | 0.000 | 0.322 | 0.434 |
| DEMAND POINT 14 | 2.508 | 1.479 | 1.190 | 1.479 | 1.367 | 1.029 | 0.900 | 0.595 | 1.318 | 0.949 | 0.965 | 1.174 | 0.672 | 0.322 | 0.000 | 0.129 |
| DEMAND POINT 15 | 2.460 | 1.431 | 1.302 | 1.431 | 1.318 | 0.981 | 0.852 | 0.547 | 1.431 | 1.061 | 1.077 | 1.286 | 0.662 | 0.434 | 0.129 | 0.000 |

D12

| PLACE | DEMAND AMOUNT | SIZE OF TRUCK THAT CAN ENTER |
|---|---|---|
| SUPPLY POINT | 0.000 | 320 |
| DEMAND POINT 1 | 6.914 | 320 |
| DEMAND POINT 2 | 1.963 | 320 |
| DEMAND POINT 3 | 1.707 | 20 |
| DEMAND POINT 4 | 1.963 | 20 |
| DEMAND POINT 5 | 3.336 | 20 |
| DEMAND POINT 6 | 3.140 | 320 |
| DEMAND POINT 7 | 2.355 | 320 |
| DEMAND POINT 8 | 1.374 | 320 |
| DEMAND POINT 9 | 1.178 | 320 |
| DEMAND POINT 10 | 0.981 | 320 |
| DEMAND POINT 11 | 1.178 | 320 |
| DEMAND POINT 12 | 0.785 | 320 |
| DEMAND POINT 13 | 1.178 | 20 |
| DEMAND POINT 14 | 1.374 | 20 |
| DEMAND POINT 15 | 1.178 | 20 |

| PLACE | DEMAND AMOUNT | SIZE OF TRUCK THAT CAN ENTER |
|---|---|---|
| SUPPLY POINT | 0.000 | 320 |
| DEMAND POINT 1 | 6.914 | 320 |
| DEMAND POINT 2 | 1.963 | 60 |
| DEMAND POINT 3 | 2.707 | 100 |
| DEMAND POINT 4 | 1.963 | 100 |
| DEMAND POINT 5 | 3.336 | 100 |
| DEMAND POINT 6 | 3.140 | 100 |
| DEMAND POINT 7 | 2.355 | 100 |
| DEMAND POINT 8 | 1.374 | 60 |
| DEMAND POINT 9 | 1.178 | 60 |
| DEMAND POINT 10 | 0.981 | 60 |
| DEMAND POINT 11 | 1.178 | 60 |
| DEMAND POINT 12 | 0.785 | 60 |
| DEMAND POINT 13 | 1.178 | 60 |
| DEMAND POINT 14 | 1.374 | 100 |
| DEMAND POINT 15 | 1.178 | 100 |

D21

| PLACE | SUPPLY POINT | DEMAND POINT 1 | DEMAND POINT 2 | DEMAND POINT 3 | DEMAND POINT 4 | DEMAND POINT 5 | DEMAND POINT 6 | DEMAND POINT 7 | DEMAND POINT 8 | DEMAND POINT 9 | DEMAND POINT 10 | DEMAND POINT 11 | DEMAND POINT 12 | DEMAND POINT 13 | DEMAND POINT 14 | DEMAND POINT 15 |
|---|---|---|---|---|---|---|---|---|---|---|---|---|---|---|---|---|
| SUPPLY POINT | 0.000 | 1.029 | 1.351 | 1.592 | 1.592 | 1.592 | 1.759 | 1.945 | 1.720 | 1.865 | 1.929 | 1.865 | 2.219 | 2.203 | 2.508 | 2.460 |
| DEMAND POINT 1 | 1.029 | 0.000 | 0.322 | 0.852 | 0.772 | 0.627 | 0.730 | 0.916 | 0.691 | 0.836 | 0.900 | 0.836 | 1.190 | 1.174 | 1.479 | 1.431 |
| DEMAND POINT 2 | 1.351 | 0.322 | 0.000 | 0.933 | 0.836 | 0.595 | 0.531 | 0.836 | 0.354 | 0.515 | 0.579 | 0.515 | 1.238 | 0.868 | 1.190 | 1.302 |
| DEMAND POINT 3 | 1.592 | 0.852 | 0.933 | 0.000 | 0.198 | 0.515 | 0.691 | 0.884 | 1.254 | 1.334 | 1.447 | 1.479 | 1.270 | 1.640 | 1.479 | 1.431 |
| DEMAND POINT 4 | 1.592 | 0.772 | 0.836 | 0.198 | 0.000 | 0.418 | 0.595 | 0.772 | 1.158 | 1.238 | 1.334 | 1.334 | 1.158 | 1.527 | 1.367 | 1.318 |
| DEMAND POINT 5 | 1.592 | 0.627 | 0.595 | 0.515 | 0.418 | 0.000 | 0.236 | 0.434 | 0.949 | 0.965 | 1.029 | 1.029 | 0.820 | 1.190 | 1.029 | 0.981 |
| DEMAND POINT 6 | 1.759 | 0.730 | 0.531 | 0.691 | 0.595 | 0.236 | 0.000 | 0.306 | 0.852 | 0.804 | 0.868 | 0.691 | 1.061 | 1.061 | 0.900 | 0.852 |
| DEMAND POINT 7 | 1.945 | 0.916 | 0.836 | 0.884 | 0.772 | 0.434 | 0.306 | 0.000 | 1.158 | 1.158 | 1.238 | 1.077 | 0.691 | 0.756 | 0.595 | 0.547 |
| DEMAND POINT 8 | 1.720 | 0.691 | 0.354 | 1.254 | 1.158 | 0.949 | 0.852 | 1.158 | 0.000 | 0.563 | 0.611 | 0.450 | 1.367 | 0.997 | 1.318 | 1.431 |
| DEMAND POINT 9 | 1.865 | 0.836 | 0.515 | 1.334 | 1.238 | 0.965 | 0.804 | 1.158 | 0.563 | 0.000 | 0.314 | 0.322 | 0.997 | 0.627 | 0.949 | 1.061 |
| DEMAND POINT 10 | 1.929 | 0.900 | 0.579 | 1.447 | 1.334 | 1.029 | 0.868 | 1.238 | 0.611 | 0.314 | 0.000 | 0.241 | 1.013 | 0.643 | 0.965 | 1.077 |
| DEMAND POINT 11 | 1.865 | 0.836 | 0.515 | 1.479 | 1.334 | 1.238 | 1.077 | 1.431 | 0.450 | 0.322 | 0.241 | 0.000 | 1.222 | 0.852 | 1.174 | 1.286 |
| DEMAND POINT 12 | 2.219 | 1.190 | 1.238 | 1.270 | 1.158 | 0.820 | 0.691 | 0.386 | 1.367 | 0.997 | 1.013 | 1.222 | 0.000 | 0.370 | 0.672 | 0.662 |
| DEMAND POINT 13 | 2.203 | 1.174 | 0.868 | 1.640 | 1.527 | 1.190 | 1.061 | 0.756 | 0.997 | 0.627 | 0.643 | 0.852 | 0.370 | 0.000 | 0.322 | 0.434 |
| DEMAND POINT 14 | 2.508 | 1.479 | 1.190 | 1.479 | 1.367 | 1.029 | 0.900 | 0.595 | 1.318 | 0.949 | 0.965 | 1.174 | 0.672 | 0.322 | 0.000 | 0.129 |
| DEMAND POINT 15 | 2.460 | 1.431 | 1.302 | 1.431 | 1.318 | 0.981 | 0.852 | 0.547 | 1.431 | 1.061 | 1.077 | 1.286 | 0.662 | 0.434 | 0.129 | 0.000 |

| PLACE | DEMAND AMOUNT | SIZE OF TRUCK THAT CAN ENTER |
|---|---|---|
| SUPPLY POINT | 0.000 | 320 |
| DEMAND POINT 1 | 6.914 | 320 |
| DEMAND POINT 2 | 1.963 | 320 |
| DEMAND POINT 3 | 4.707 | 320 |
| DEMAND POINT 4 | 1.963 | 320 |
| DEMAND POINT 5 | 3.336 | 120 |
| DEMAND POINT 6 | 3.140 | 120 |
| DEMAND POINT 7 | 2.355 | 120 |
| DEMAND POINT 8 | 1.374 | 320 |
| DEMAND POINT 9 | 1.178 | 320 |
| DEMAND POINT 10 | 0.981 | 320 |
| DEMAND POINT 11 | 1.178 | 320 |
| DEMAND POINT 12 | 0.785 | 20 |
| DEMAND POINT 13 | 1.178 | 20 |
| DEMAND POINT 14 | 1.374 | 20 |
| DEMAND POINT 15 | 1.178 | 20 |

D31

| PLACE | SUPPLY POINT | DEMAND POINT 1 | DEMAND POINT 2 | DEMAND POINT 3 | DEMAND POINT 4 | DEMAND POINT 5 | DEMAND POINT 6 | DEMAND POINT 7 | DEMAND POINT 8 | DEMAND POINT 9 | DEMAND POINT 10 | DEMAND POINT 11 | DEMAND POINT 12 | DEMAND POINT 13 | DEMAND POINT 14 | DEMAND POINT 15 |
|---|---|---|---|---|---|---|---|---|---|---|---|---|---|---|---|---|
| SUPPLY POINT | 0.000 | 1.029 | 1.351 | 1.592 | 1.592 | 1.592 | 1.759 | 1.945 | 1.720 | 1.865 | 1.929 | 1.865 | 2.219 | 2.203 | 2.508 | 2.460 |
| DEMAND POINT 1 | 1.029 | 0.000 | 0.322 | 0.852 | 0.772 | 0.627 | 0.730 | 0.916 | 0.691 | 0.836 | 0.900 | 0.836 | 1.190 | 1.174 | 1.479 | 1.431 |
| DEMAND POINT 2 | 1.351 | 0.322 | 0.000 | 0.933 | 0.836 | 0.595 | 0.531 | 0.836 | 0.354 | 0.515 | 0.579 | 0.515 | 1.238 | 0.868 | 1.190 | 1.302 |
| DEMAND POINT 3 | 1.592 | 0.852 | 0.933 | 0.000 | 0.198 | 0.691 | 0.884 | 1.254 | 1.158 | 1.334 | 1.447 | 1.479 | 1.270 | 1.640 | 1.479 | 1.431 |
| DEMAND POINT 4 | 1.592 | 0.772 | 0.836 | 0.198 | 0.000 | 0.515 | 0.691 | 0.884 | 1.158 | 1.334 | 1.334 | 1.334 | 1.158 | 1.527 | 1.367 | 1.318 |
| DEMAND POINT 5 | 1.592 | 0.627 | 0.595 | 0.691 | 0.515 | 0.000 | 0.418 | 0.772 | 0.434 | 0.515 | 0.579 | 0.820 | 0.820 | 1.190 | 1.029 | 0.981 |
| DEMAND POINT 6 | 1.759 | 0.730 | 0.531 | 0.884 | 0.691 | 0.418 | 0.000 | 0.306 | 0.949 | 1.029 | 1.158 | 1.238 | 0.386 | 0.691 | 1.061 | 1.061 |
| DEMAND POINT 7 | 1.945 | 0.916 | 0.836 | 1.254 | 0.884 | 0.772 | 0.306 | 0.000 | 1.158 | 1.238 | 1.431 | 1.431 | 0.450 | 0.997 | 1.318 | 1.431 |
| DEMAND POINT 8 | 1.720 | 0.691 | 0.354 | 1.158 | 1.158 | 0.434 | 0.949 | 1.158 | 0.000 | 0.563 | 0.611 | 0.450 | 1.367 | 0.627 | 0.949 | 1.061 |
| DEMAND POINT 9 | 1.865 | 0.836 | 0.515 | 1.334 | 1.334 | 0.515 | 1.029 | 1.238 | 0.563 | 0.000 | 0.314 | 0.322 | 0.997 | 0.643 | 0.965 | 1.077 |
| DEMAND POINT 10 | 1.929 | 0.900 | 0.579 | 1.447 | 1.334 | 0.579 | 1.158 | 1.431 | 0.611 | 0.314 | 0.000 | 0.241 | 1.013 | 0.852 | 1.174 | 1.286 |
| DEMAND POINT 11 | 1.865 | 0.836 | 0.515 | 1.479 | 1.334 | 0.820 | 1.238 | 1.431 | 0.450 | 0.322 | 0.241 | 0.000 | 1.222 | 0.370 | 0.672 | 0.662 |
| DEMAND POINT 12 | 2.219 | 1.190 | 1.238 | 1.270 | 1.158 | 0.820 | 0.386 | 0.450 | 1.367 | 0.997 | 1.013 | 1.222 | 0.000 | 0.370 | 0.672 | 0.434 |
| DEMAND POINT 13 | 2.203 | 1.174 | 0.868 | 1.640 | 1.527 | 1.190 | 0.691 | 0.997 | 0.627 | 0.643 | 0.852 | 0.000 | 0.370 | 0.000 | 0.322 | 0.129 |
| DEMAND POINT 14 | 2.508 | 1.479 | 1.190 | 1.479 | 1.367 | 1.029 | 0.900 | 1.318 | 0.949 | 0.965 | 1.174 | 1.174 | 0.672 | 0.322 | 0.000 | 0.129 |
| DEMAND POINT 15 | 2.460 | 1.431 | 1.302 | 1.431 | 1.318 | 0.981 | 0.852 | 1.431 | 1.061 | 1.077 | 1.286 | 0.662 | 0.434 | 0.129 | 0.129 | 0.000 |

D32

NON-TRANSITORY COMPUTER-READABLE STORAGE MEDIUM FOR STORING DELIVERY PLAN CREATION SUPPORT PROGRAM, DELIVERY PLAN CREATION SUPPORT METHOD, AND INFORMATION PROCESSING APPARATUS

CROSS-REFERENCE TO RELATED APPLICATION

This application is based upon and claims the benefit of priority of the prior Japanese Patent Application No. 2020-77846, filed on Apr. 24, 2020, the entire contents of which are incorporated herein by reference.

FIELD

An embodiment discussed herein is related to a non-transitory computer-readable storage medium storing a delivery plan creation support program, a delivery plan creation support method, and an information processing apparatus.

BACKGROUND

Typically, a delivery plan from a supply point (delivery source) such as a factory to a plurality of demand points (delivery destination) is treated as a vehicle routing problem (VRP) that optimizes a delivery cost on the basis of a demand amount (delivery amount) of each demand point, a distance between the supply point and the demand point, or the like.

Regarding this VRP, a technique is known for searching for an optimum solution of the problem by formulating a delivery plan problem as a minimization problem of an energy function and obtaining the minimum state of the energy function using simulated annealing.

Examples of the related art include Japanese Laid-open Patent Publication No. 2005-263447 and Japanese Laid-open Patent Publication No. 2002-356232.

SUMMARY

According to an aspect of the embodiments, provided is a method implemented by a computer. In an example, the method includes: for each of a delivery source and each of a plurality of delivery destinations to which goods are delivered from the delivery source, receiving distance information that indicates a distance between points, delivery amount information that indicates a total delivery amount of the goods to each of the plurality of delivery destinations, and maximum delivery amount information that indicates a maximum delivery amount per delivery; calculating a first cost to deliver the goods for the total delivery amount from the delivery source to each of the plurality of delivery destinations while setting the maximum delivery amount indicated by the maximum delivery amount information as an upper limit; calculating a second cost to deliver the goods for the total delivery amount from the delivery source to each of the delivery destinations to which the goods are delivered via a relay point and each of the delivery destinations to which the goods are delivered not via the relay point in a case where the maximum delivery amount indicated by the maximum delivery amount information is set as the upper limit and a predetermined delivery destination among the plurality of delivery destinations is set as the relay point; executing selection processing for selecting a delivery destination to be the relay point and the delivery destination to which the goods are delivered via the relay point from among the plurality of delivery destinations on the basis of the first cost and the second cost; and creating a delivery plan for delivering the goods from the delivery source to the plurality of delivery destinations on the basis of a result of the selection processing.

The object and advantages of the invention will be realized and attained by means of the elements and combinations particularly pointed out in the claims.

It is to be understood that both the foregoing general description and the following detailed description are exemplary and explanatory and are not restrictive of the invention.

It is possible to support reduction in a calculation cost when a delivery plan is created.

BRIEF DESCRIPTION OF DRAWINGS

FIG. 3C is a flowchart illustrating an exemplary operation of the information processing apparatus according to the embodiment;

FIG. 4 is an explanatory diagram for explaining an example of a value according to a relay point selection formula;

FIG. 7A is an explanatory diagram for explaining an example of input data;

FIG. 8A is an explanatory diagram for explaining an example of the input data;

FIG. 9A is an explanatory diagram for explaining an example of the input data;

DESCRIPTION OF EMBODIMENTS

However, the above related art has a problem in that there is a case where it is difficult to analyze and optimize all combinations in terms of a calculation cost because the number of combinations becomes enormous if the number of delivery points increases.

For example, the number of combinations is about 60 (5!/2) in a case where the number of delivery points is five, is about 1.8 million (10!/2) in a case where the number of delivery points is 10, and is about 600 billion (15!/2) in a case where the number of delivery points is 15. Furthermore, when a case is assumed where a cost is further reduced by using a relay point between the supply point and the delivery destination, a path including the relay point in the middle is considered, and the number of combinations further increases.

According to one aspect, an object is to provide a delivery plan creation support program, a delivery plan creation support method, and an information processing apparatus that can support reduction in a calculation cost when a delivery plan is created.

Hereinafter, a delivery plan creation support program, a delivery plan creation support method, and an information processing apparatus according to an embodiment will be described with reference to the drawings. Configurations having the same functions in the embodiment are denoted by the same reference signs, and redundant description will be omitted. Note that the delivery plan creation support program, the delivery plan creation support method, and the information processing apparatus described in the following embodiment are merely examples and do not limit the embodiment. Additionally, each of the embodiments below may be appropriately combined unless otherwise contradicted.

Figure 1:
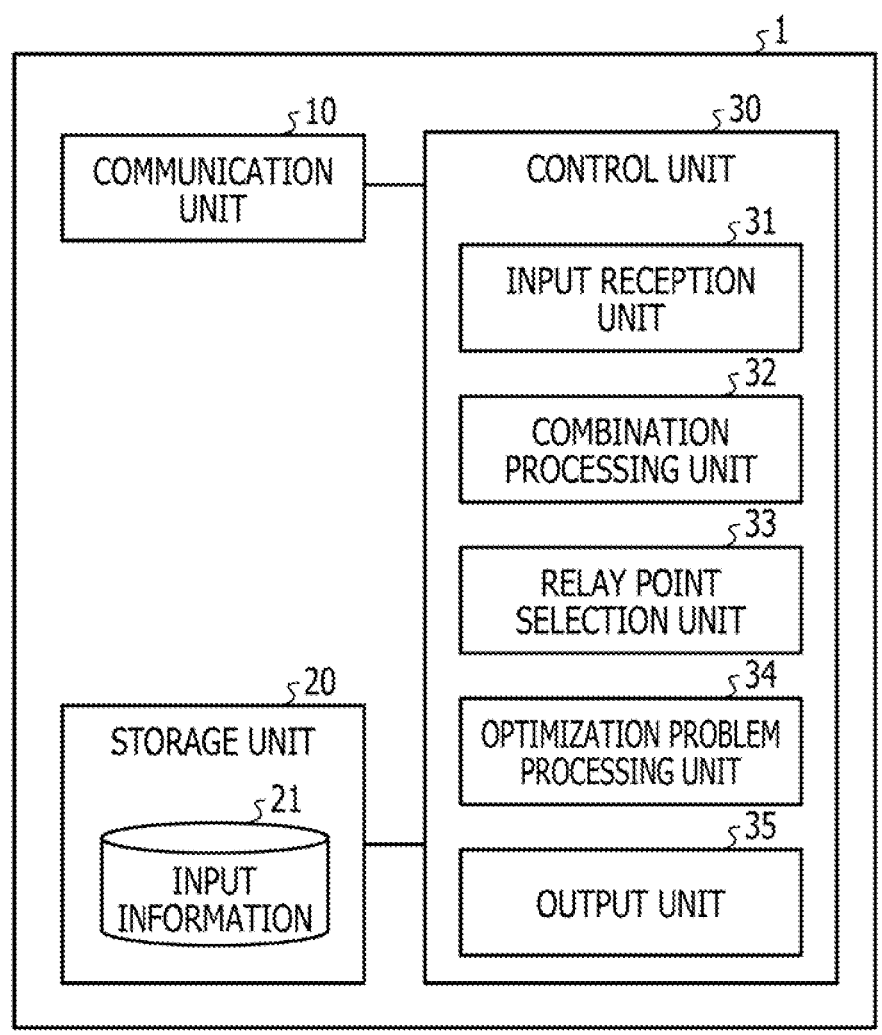
FIG. 1 is a block diagram illustrating an exemplary functional configuration of an information processing apparatus according to an embodiment.

FIG. 1 is a block diagram illustrating an exemplary functional configuration of the information processing apparatus according to the embodiment. As illustrated in FIG. 1, an information processing apparatus 1 is an apparatus that executes processing related to creation of a delivery plan from a supply point (delivery source) to a plurality of demand points (delivery destination), and for example, a personal computer (PC) or the like can be applied.

Figure 2:
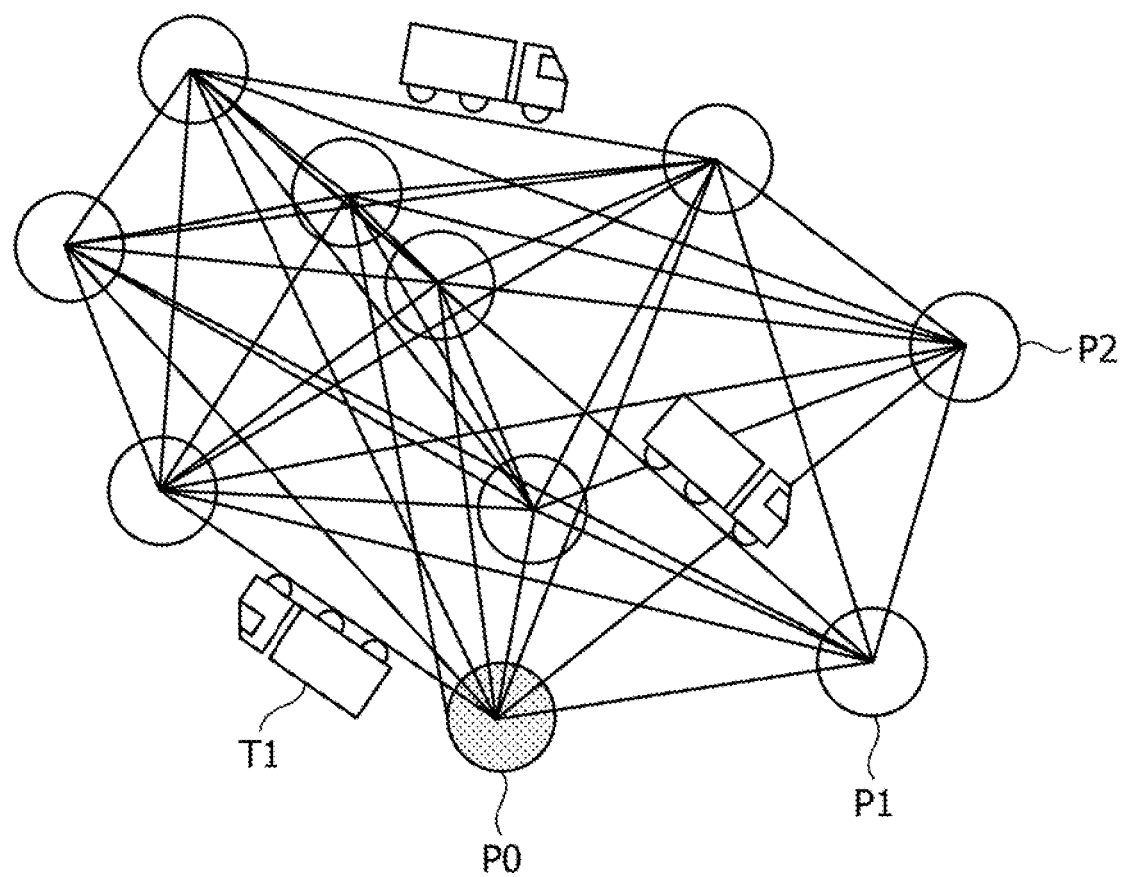
FIG. 2 is an explanatory diagram for explaining an outline of a VRP.

FIG. 2 is an explanatory diagram for explaining an outline of a VRP. As illustrated in FIG. 2, creation of a delivery plan from a supply point P0 to demand points P1, P2 . . . is treated as the VRP that optimizes a delivery cost. The information processing apparatus 1 creates the delivery plan from the supply point P0 to the demand points P1, P2 . . . by solving an optimization problem of the delivery cost on the basis of a demand amount (delivery amount) at each of the demand points P1, P2 . . . , a distance between points, or the like.

When the delivery plan is created, there is a case where the delivery cost is reduced by utilizing some demand points as relay points and delivering goods through the relay points than that in a case where the goods are directly delivered from the supply point P0 to each of the demand points P1, P2 . . . .

Before creating the delivery plan, the information processing apparatus 1 selects a relay point estimated to have a lower delivery cost and a delivery destination (demand point) to which the goods are delivered via the relay point from among the demand points P1, P2 . . . . Next, the information processing apparatus 1 creates the delivery plan from the supply point P0 to the demand points P1, P2 . . . on the basis of the selection result. Specifically, for example, the information processing apparatus 1 divides points into a group including the selected relay point and the delivery destinations (demand point) to which the goods are delivered via the relay point and a group including the delivery destinations (demand point) to which the goods are directly delivered from the supply point P0 not via the relay point and creates a delivery plan for each group.

As a result, the number of combinations of delivery paths when the delivery plan is created is largely reduced than that in a case where delivery paths from the supply point P0 to all the delivery destinations (demand points P1, P2 . . . ) are examined. Therefore, regarding the information processing apparatus 1, it is expected to largely lower a calculation cost when the optimization problem is solved at the time of creating the delivery plan.

Here, a configuration of the information processing apparatus 1 will be described in detail. As illustrated in FIG. 1, the information processing apparatus 1 includes a communication unit 10, a storage unit 20, and a control unit 30.

The communication unit 10 communicates with another device (for example, display device, server device, or the like) via a communication cable or the like under control of the control unit 30. The communication unit 10 is realized by, for example, a communication interface connected to the display device, a network interface card (NIC) connected to a communication network such as a local area network (LAN), or the like.

The storage unit 20 corresponds to, for example, a semiconductor memory element such as a random access memory (RAM) and a flash memory, or a storage device such as a hard disk drive (HDD). The storage unit 20 stores input information 21 or the like regarding input data received by an input reception unit 31.

Note that the input information 21 is, for example, an INPUT file or the like that is input as a delivery condition when the delivery plan is created. The INPUT file includes, for example, distance information indicating a distance between points including the supply point P0 and each of demand points P1, P2 . . . , a total delivery amount of goods to each of the demand points P1, P2 . . . , a truck size that indicates a maximum allowable delivery amount per delivery, or the like.

The control unit 30 includes the input reception unit 31, a combination processing unit 32, a relay point selection unit 33, an optimization problem processing unit 34, and an output unit 35. The control unit 30 can be implemented by a central processing unit (CPU), a micro processing unit (MPU), or the like. Furthermore, the control unit 30 can be realized by a hard wired logic such as an application specific integrated circuit (ASIC), a field programmable gate array (FPGA), or the like.

The input reception unit 31 is a processing unit that receives data input. Specifically, for example, the input reception unit 31 receives data input, for example, by an operation input through a keyboard, a touch panel, or the like, a file input through communication via the communication unit 10. Next, the input reception unit 31 stores the input data in the storage unit 20 as the input information 21. For example, the input reception unit 31 stores the INPUT file that has been input as the delivery condition when the delivery plan is created in the storage unit 20 as the input information 21. In other words, for example, the input reception unit 31 is an example of a reception unit.

The combination processing unit 32 is a processing unit that lists combinations of all the demand points (warehouse) to which the goods are delivered from the relay point in a case where a predetermined delivery destination is set as the relay point for each delivery destination (demand points P1, P2 . . . ) in the INPUT file that has been input as the delivery condition.

Specifically, for example, the combination processing unit 32 sets each delivery destination in the INPUT file as a relay point and lists all the combinations of the demand points (warehouse) to which delivery is made via the relay point. As a result, the information processing apparatus 1 can obtain all the combinations of the relay point and the delivery destinations (demand point) to which the goods are delivered via the relay point, from among the plurality of delivery destinations (demand points P1, P2 . . . ) in the INPUT file.

The relay point selection unit 33 is a processing unit that selects a relay point that is estimated to have a lower delivery cost and the delivery destinations (demand point) via the relay point from among the demand points P1, P2 . . . in the INPUT file.

Specifically, for example, the relay point selection unit 33 estimates the delivery cost as follows for all the combinations listed by the combination processing unit 32 and selects the relay point and the delivery destinations (demand point) via the relay point. First, the relay point selection unit 33 obtains a cost (first cost) for delivery from the delivery source (supply point P0) to each delivery destination (demand points P1, P2 . . . ) for the total delivery amount while setting a truck size received from the INPUT file as an upper limit.

Furthermore, the relay point selection unit 33 obtains a cost for delivery for the total delivery amount from the delivery source (supply point P0) to each delivery destination via the relay point in a case where a predetermined delivery destination among the plurality of delivery destinations (demand points P1, P2 . . . ) is set as a relay point in all the listed combinations. Furthermore, the relay point selection unit 33 obtains a cost for delivery for the total delivery amount to each delivery destination not via the relay point and obtains a cost (second cost) obtained by adding the cost for the delivery via the relay point and the cost for the delivery not via the relay point.

Next, the relay point selection unit 33 selects a relay point and a delivery destination to which the goods are delivered via the relay point from among the plurality of delivery destinations on the basis of the first cost and the second cost. Specifically, for example, the relay point selection unit 33 extracts the relay point and the delivery destination to which the goods are delivered via the relay point in a case where the second cost is smaller than the first cost. Next, the relay point selection unit 33 sets a combination (relay point and delivery destination to which goods are delivered via relay point) that minimizes the second cost among the extracted combinations as a selection result.

More specifically, for example, the relay point selection unit 33 selects the relay point and the delivery destination to which the goods are delivered via the relay point using the following selection formula (1) for selecting the relay point.

$$C = \sum_{i=S} D_{oi} \frac{P_i}{\min(T_0, T_i)} - \left( D_{or} \frac{\sum_{i=S} P_i}{\min(T_0, T_r)} + \sum_{i=S} D_{ri} \frac{P_i}{T_i} \right) \quad (1)$$

$$\begin{cases} D_{ij} = d_{ij}*2 + CL \\ T_i : \text{Maximum truck size that can be selected in warehouse } i \\ P_i : \text{total delivery amount to warehouse } i \\ d_{i,j} : \text{distance between warehouses } i \text{ and } j \text{ (However, 0 means} \\ \text{departure point, } r \text{ means relay point)} \\ S: \text{set of warehouses} \end{cases}$$

In the formula (1), $d_{i,j}$ indicates a distance between points (warehouse) i and j and corresponds to the distance information indicating the distance between the points in the INPUT file. However, zero means a departure point (supply point P0), and r means a relay point. CL is a preset value (for example, cost value such as 0.5 corresponding to 0.25 per day needed for loading or unloading) as a cost related to unloading. In other words, for example, $D_{ij}$ indicates a cost in a case where the goods are delivered by traveling between the points i-j.

Ti is a maximum truck size that can be selected in the warehouse (i) at the demand point and corresponds to the maximum truck size in the INPUT file. $P_i$ is a total delivery amount to the warehouse (i) at the demand point and corresponds to the total delivery amount of the goods in the INPUT file. S is a set of warehouses and corresponds to all the combinations listed by the combination processing unit 32.

The first term on the right side in the formula (1) corresponds to the cost (first cost) in a case where goods are directly transported from the supply point P0 to each demand point (warehouse). Furthermore, the second term on the right side corresponds to the cost in a case where the goods are transported from the supply point P0 to the relay point (r). Furthermore, the third term on the right side corresponds to the cost in a case where the goods are transported from the relay point (r) to each demand point (warehouse). In other words, for example, the second term on the right side+the third term on the right side corresponds to the cost (second cost) in a case where the goods are transported to each demand point via the relay point.

The relay point selection unit 33 obtains C (difference between first cost and second cost) from the above selection formula (1) for all the combinations listed by the combination processing unit 32. Next, the relay point selection unit 33 sets a combination (relay point and delivery destination to which goods are delivered via relay point) that has a larger C among all the listed combinations as a selection result.

The optimization problem processing unit 34 is a processing unit that creates a delivery plan for delivering goods from a delivery source to a plurality of delivery destinations by solving an optimization problem of a cost for delivery under a condition such as a demand amount (delivery amount) at each of the demand points P1, P2 . . . , a distance between points, or the like on the basis of the selection result of the relay point selection unit 33. Specifically, for example, the optimization problem processing unit 34 divides the points into a group of relay points selected by the relay point selection unit 33 and delivery destinations (demand point) to which the goods are delivered via the relay point, and a group of delivery destinations (demand point) to which the goods are directly delivered from the supply point P0 not via the relay point, and solves an optimization problem for each divided group. The optimization problem processing unit 34 combines the delivery plan via the relay point and the delivery plan not via the relay point that are obtained by solving the optimization problem in this way and creates a delivery plan for delivering the goods from the delivery source to the plurality of delivery destinations.

Note that, as a method for solving the optimization problem by the optimization problem processing unit 34, a known method can be applied for formulating the delivery plan problem as the minimization problem of the energy function and solving the minimum state of the energy function, which has been formulated, using, for example, simulated annealing.

The output unit 35 is a processing unit that executes output processing such as display output or file output to the display device. Specifically, for example, the output unit 35 outputs the delivery plan for delivering the goods from the delivery source (supply point P0) to the plurality of delivery destinations (demand points P1, P2 . . . ) created by the optimization problem processing unit 34 to a user as a display output or a file output to the display device.

Figure 3A:
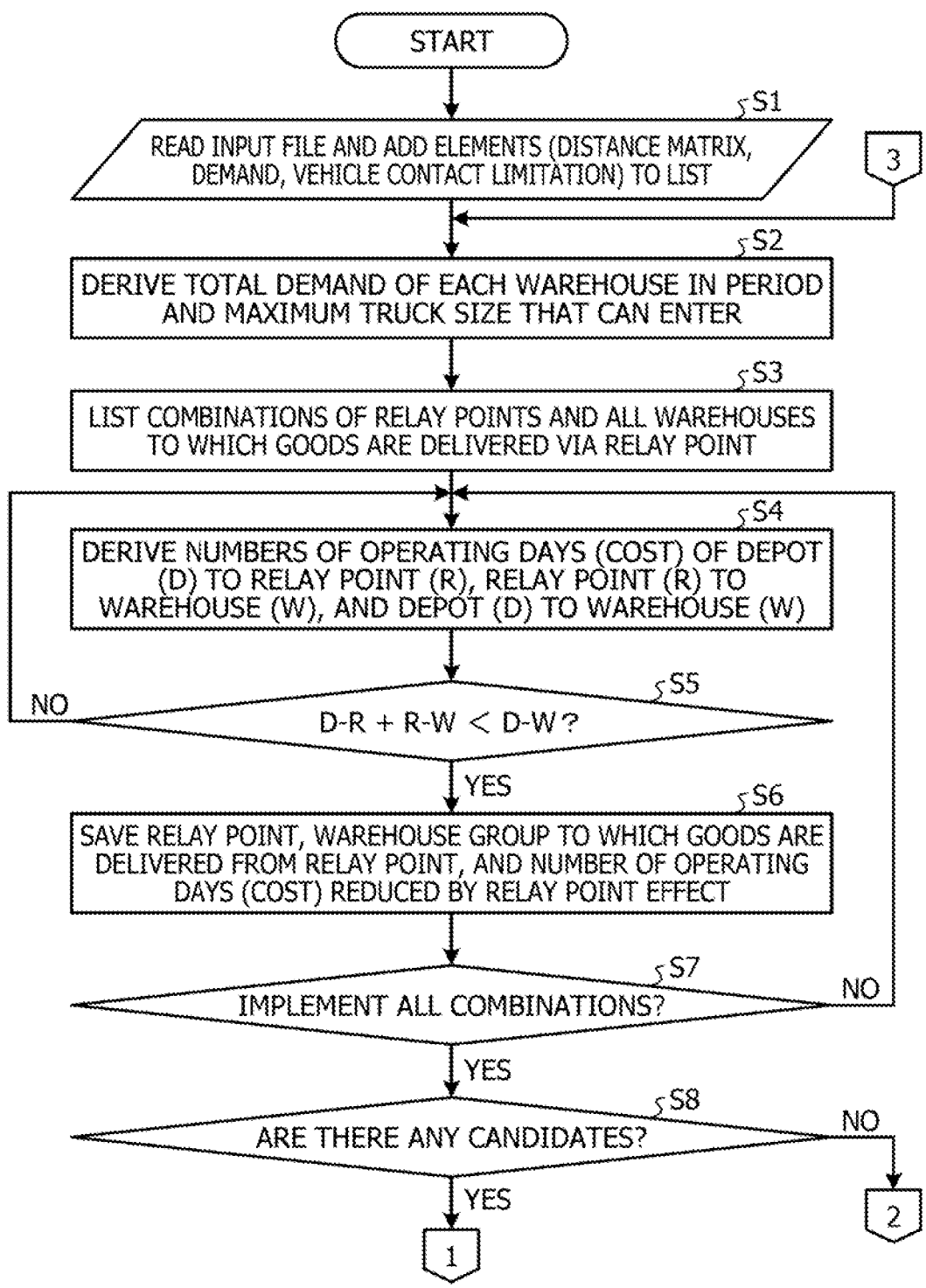
FIG. 3A is a flowchart illustrating an exemplary operation of the information processing apparatus according to the embodiment.
Figure 3B:
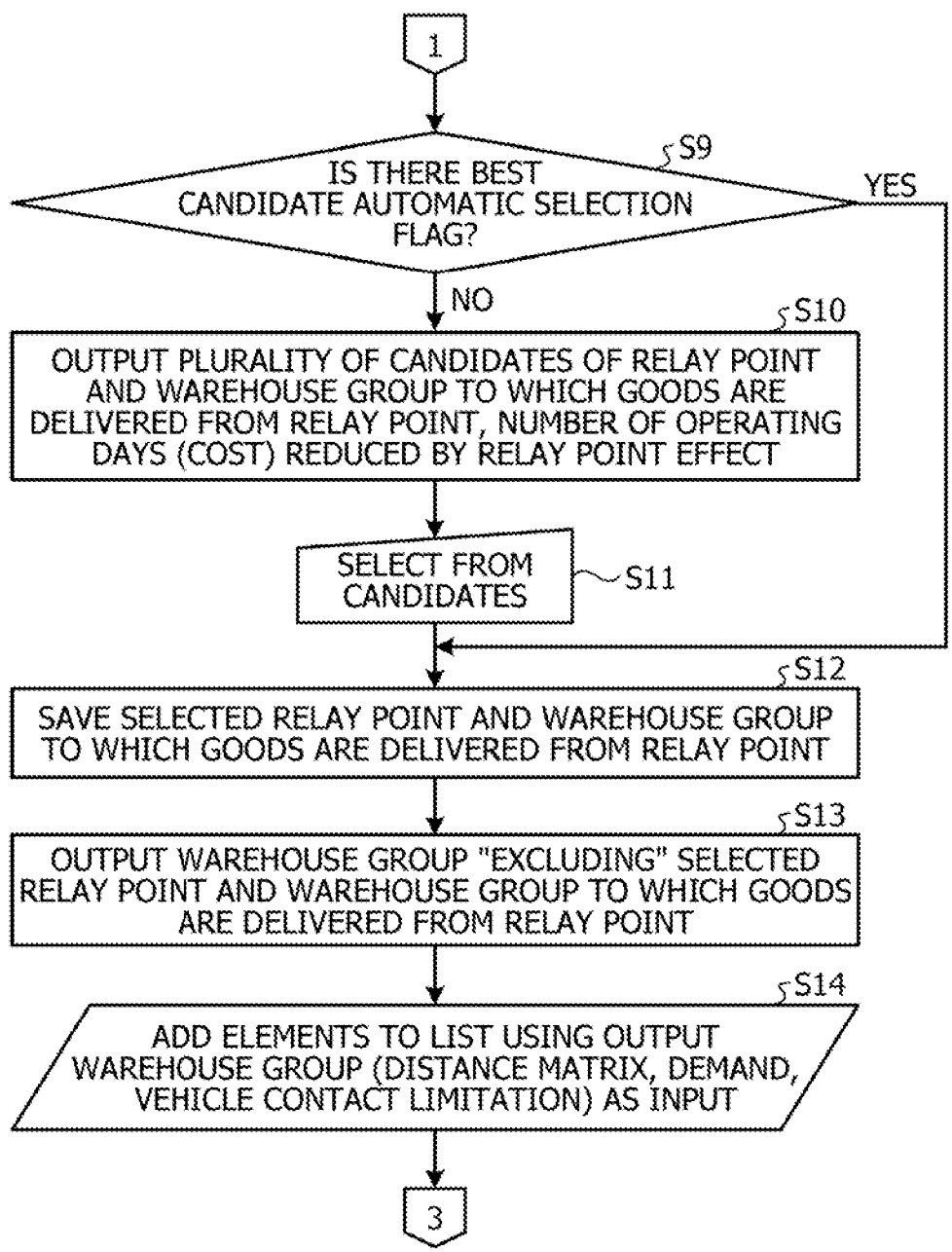
FIG. 3B is a flowchart illustrating an exemplary operation of the information processing apparatus according to the embodiment.

FIGS. 3A to 3C are flowcharts illustrating an exemplary operation of the information processing apparatus 1 according to the embodiment.

As illustrated in FIG. 3A, when the processing is started, the combination processing unit 32 reads the INPUT file (input information 21), and adds elements (distance matrix indicating distance between points, demand (amount), vehicle contact limitation (truck size)) to the list including the supply point P0 and the demand points P1, P2 . . . (S1).

Next, the combination processing unit 32 derives a total demand (amount) of each warehouse (demand points P1, P2 . . . ) in a period and the maximum size of the truck that can enter from the elements in the list (S2).

Next, the combination processing unit 32 lists combinations of the relay point and all the warehouses (demand points) to which the goods are delivered via the relay point from among the delivery destinations (demand points P1 and P2) in the INPUT file (S3).

Next, the relay point selection unit 33 derives the number of operating days (cost) in each of the listed combinations by using the selection formula (1) (S4). Specifically, for example, the relay point selection unit 33 derives the number of operating days (cost) from the departure point (depot (D)) to the relay point (R) from the second term on the right side of the selection formula (1). Furthermore, the relay point selection unit 33 derives the number of operating days (cost) from the relay point (R) to the warehouse (W) from the third term on the right side of the selection formula (1). Furthermore, the relay point selection unit 33 derives the number of operating days (cost) from the departure point (depot (D)) to the warehouse (W) from the first term on the right side of the selection formula (1).

Next, the relay point selection unit 33 determines whether or not the total of the cost of (D–R)+the cost of (R–W) is smaller than the cost of (D–W) (S5). In S5, a combination in which the total of the cost of (D–R)+the cost of (R–W) is not smaller than the cost of (D–W) is a case where a smaller cost is needed if the goods are directly delivered from the supply point P0 to each demand point. Therefore, in a case where the total of the cost of (D–R)+the cost of (R–W) is not smaller than the cost of (D–W) (S5: No), the relay point selection unit 33 returns the processing to S4 in order to derive a cost of the next combination.

Furthermore, the combination in which the total of the cost of (D–R)+the cost of (R–W) is smaller than the cost of (D–W) in S5 is a case where it is estimated that the cost is lower if the delivery is made via the relay point. Therefore, in a case where the total of the cost of (D–R)+the cost of (R–W) is smaller than the cost of (D–W) (S5: Yes), the relay point selection unit 33 saves the relay point and the warehouse (demand point) group to which the goods are delivered from the relay point in a memory or the like together with the number of operating days (cost) that has been derived as the value of C in the selection formula (1) and has been reduced by a relay point effect (S6).

Next, the relay point selection unit 33 determines whether or not all the combinations listed in S3 have been implemented (S7). In a case where all the combinations have not been implemented (S7: No), the relay point selection unit 33 returns the processing to S4 to examine the next combination.

Next, the relay point selection unit 33 determines whether or not there is a candidate of the group of the relay point and the warehouses (demand point) to which the goods are delivered from the relay point saved in the memory (S8).

In a case where there is a candidate (S8: Yes), as illustrated in FIG. 3B, the relay point selection unit 33 determines whether or not there is a best candidate automatic selection flag (S9). The best candidate automatic selection flag is a flag that is set in advance by a user or the like. In a case where there is a flag (S9: Yes), the relay point selection unit 33 automatically selects a candidate that minimizes the cost from among the plurality of candidates.

In a case where there is no flag (S9: No), the relay point selection unit 33 displays and outputs a plurality of candidates of the relay point, the warehouse (demand point) group to which the goods are delivered from the relay point, and the number of operating days (cost) reduced by the relay point effect that are saved in the memory via the output unit 35 (S10). Next, the relay point selection unit 33 receives the selection of the candidate selected from among the plurality of candidates that has been displayed and output on the basis of an operation input on a keyboard or the like (S11).

FIG. 4 is an explanatory diagram for explaining an example of a value according to a relay point selection formula. As illustrated in FIG. 4, the relay point selection unit 33 displays and outputs the relay point, the warehouse (demand point) group to which the goods are delivered from the relay point, and the operating days (cost) that is derived as the value of C and is reduced by the relay point effect from the relay point selection formula (1). As a result, the user can select a candidate selected from among the plurality of candidates by referring to content of the relay point and the warehouse (demand point) group to which the goods are delivered from the relay point and the value of the cost.

Next, the relay point selection unit 33 saves the selected relay point and warehouse (demand point) group to which the goods are delivered from the relay point in the memory or the like as one of the selection results (S12).

Next, the relay point selection unit 33 outputs a warehouse group "excluding" the selected relay point and warehouse (demand point) group to which the goods are delivered from the relay point (S13). Specifically, for example, the relay point selection unit 33 outputs a list of the delivery destinations, excluding the selected relay point and warehouse (demand point) group to which the goods are delivered from the relay point from among the plurality of delivery destinations (demand points P1, P2 . . . ) in the INPUT file.

Next, the combination processing unit 32 adds, as in S1, the elements (distance matrix indicating distance between points, demand (amount), and vehicle contact limitation (truck size)) to the list of the warehouse (demand point) group after the exclusion in S13 using the output warehouse group in S13 as INPUT (S14).

Next, the combination processing unit 32 returns the processing to S2 and executes the processing in and subsequent to S2 on the list of the warehouse (demand point) group after the exclusion in S13. As a result, the information processing apparatus 1 selects a relay point different from the relay point selected in the previous processing and a delivery destination to which the goods are delivered via the different relay point from among the warehouse (demand point) group after the exclusion in S13.

In a case where there is no candidate in S8 (S8: No), the optimization problem processing unit 34 executes the processing for creating the delivery plan for delivering the goods from the delivery source to the plurality of delivery destinations (S15 to S18) on the basis of the selection result of the relay point selection unit 33.

Specifically, for example, the optimization problem processing unit 34 reads the relay point and the warehouse (demand point) group, to which the goods are delivered from the relay point, selected by the relay point selection unit 33 from the memory (S15).

Next, the optimization problem processing unit 34 divides the optimization problem into a group of the delivery destinations (demand point) to which the goods are delivered via the relay point read from the memory and the group of the delivery destinations (demand point) that are not selected (delivery destination to which goods are directly delivered from supply point P0 not via relay point) (S16).

For example, the optimization problem processing unit 34 sets a division problem (1) of the optimization problem regarding the delivery destination to which the goods are directly delivered from the supply point P0 not via the relay point (S16a). Specifically, for example, the optimization problem processing unit 34 adds the elements (distance matrix indicating distance between points, demand (amount), vehicle contact limitation (truck size)) to the list at each point using the group of the warehouses (demand point) not selected (delivery destination to which goods are directly supplied from supply point P0 not via relay point) and the selected relay point as INPUT.

Furthermore, the optimization problem processing unit 34 sets the division problem (2A, 2B . . . ) of the optimization problem regarding the delivery destination to which the goods are delivered via the relay point for each of the selected relay points (S16b, S16c . . . ). Specifically, for example, the optimization problem processing unit 34 adds the elements (distance matrix indicating distance between points, demand (amount), vehicle contact limitation (truck size)) to the list at each point using the selected relay point and the warehouse (demand point) group to which the goods are delivered from the relay point as INPUT.

Next, the optimization problem processing unit 34 obtains a delivery plan indicating a delivery order that minimizes a delivery cost by solving each division problem (optimization problem) in S16 by minimizing the energy function using the Ising machine, for example (S17).

Figure 5:
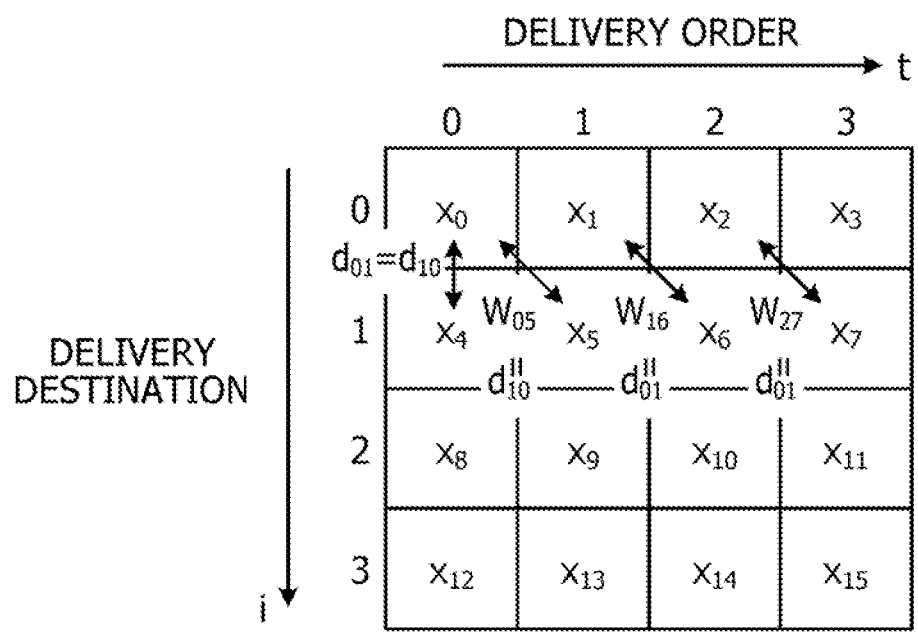
FIG. 5 is an explanatory diagram for explaining a delivery destination, a delivery order, and a distance between the delivery destinations.

Here, the energy function solved by the Ising machine will be described. FIG. 5 is an explanatory diagram for explaining a delivery destination, a delivery order, and a distance between the delivery destinations. As illustrated in FIG. 5, after a delivery destination (i) and a delivery order (t) are defined, formulization is performed by using the Ising model as indicated by the following formula (2).

$$E(x) = -\sum_{\{i,j\}} w_{ij} x_i x_j - \sum_i b_i x_i \quad (2)$$

Here, in a case where the delivery destination (i) is not the t-th point: $X_{ti}=0$ is satisfied, and in a case where the delivery destination (i) is not the t-th point, $X_{ti}=1$ is satisfied. Furthermore, $X_{00}=x_0, X_{01}=x_4, \ldots, X_{00}=x_0$, and $X_{01}=x_4, \ldots$ are satisfied.

A distance between the delivery destinations (i) and (j) is set as do. For example, $d_{01}=d_{10}=W_{05}=W_{16}=W_{27} \ldots$ is satisfied. Here, a total distance (D) is as indicated in the following formula (3).

$$D = \sum_{t,i,j} d_{ij} x_{ti} x_{(t+1)j} \quad (3)$$

Note that, only a delivery order is determined without distinguishing the departure point, the relay point, and the demand point as the delivery destination here. There is a constraint term such that "only one delivery destination at the same time". In other words, for example, $\Sigma_i X_{ti}=1 \Rightarrow (\Sigma_i X_{ti}-1)^2=0$ is satisfied, and $\Sigma_t (\Sigma_{ti}-1)^2$ is set to satisfy this formula for all t.

Furthermore, there is a constraint term such that "to pass through all the delivery destinations once". In other words, for example, $\Sigma_t X_{ti}==1=(\Sigma_t X_{ti}-1)^2=0$ is satisfied, and $\Sigma_i (\Sigma_t X_{ti}-1)^2$ is set to satisfy this formula for all i.

Therefore, the energy function is as in the following formula (4). However, α and β are factors of the above constraint terms.

$$E = D + \alpha \sum_t \left(\sum_i x_{ti} - 1\right)^2 + \beta \sum_i \left(\sum_t x_{ti} - 1\right)^2 \quad (4)$$

(α,β: Factors of constraint term)

Next, the optimization problem processing unit 34 rearranges the result obtained in S17 so that an output path starts from the supply point P0 or the relay point (S18). Next, the output unit 35 outputs the rearranged final path as the delivery plan for delivering the goods from the delivery source (supply point P0) to the plurality of delivery destinations (demand points P1, P2 . . . ) (S19). Next, the output unit 35 saves the output final path (obtained delivery plan) in the memory or the like (S20) and terminates the processing.

As described above, the information processing apparatus 1 includes the input reception unit 31, the relay point selection unit 33, and the optimization problem processing unit 34. The input reception unit 31 receives distance information indicating a distance between the points, the total delivery amount of the goods to each delivery destination, and the truck size indicating the maximum allowable delivery amount per delivery for each of the delivery source and the plurality of delivery destinations to which the goods are delivered from the delivery source. The relay point selection unit 33 sets the received truck size as the upper limit and obtains the first cost for the delivery for the total delivery amount from the delivery source to each delivery destination. Furthermore, the relay point selection unit 33 obtains the second cost for the delivery for the total delivery amount to each of the delivery destinations to which the goods are delivered from the delivery source via the relay point and each of the delivery destinations to which the goods are delivered not via the relay point in a case where a predetermined delivery destination among the plurality of delivery destinations is set as a relay point. Next, the relay point selection unit 33 selects a relay point and a delivery destination to which the goods are delivered via the relay point from among the plurality of delivery destinations on the basis of the first cost and the second cost. The optimization problem processing unit 34 creates a delivery plan for delivering the goods from the delivery source to the plurality of delivery destinations on the basis of the selection result.

In this way, the delivery plan is created after the relay point and the delivery destination to which the goods are delivered via the relay point are selected from among the plurality of delivery destinations. Therefore, the number of combinations of the delivery paths at the time of creating the delivery plan is largely reduced than that in a case where all the combinations are examined to create the delivery plan. Therefore, it is expected that a calculation cost when the optimization problem is solved at the time of creating the delivery plan is largely lowered.

Figure 6:
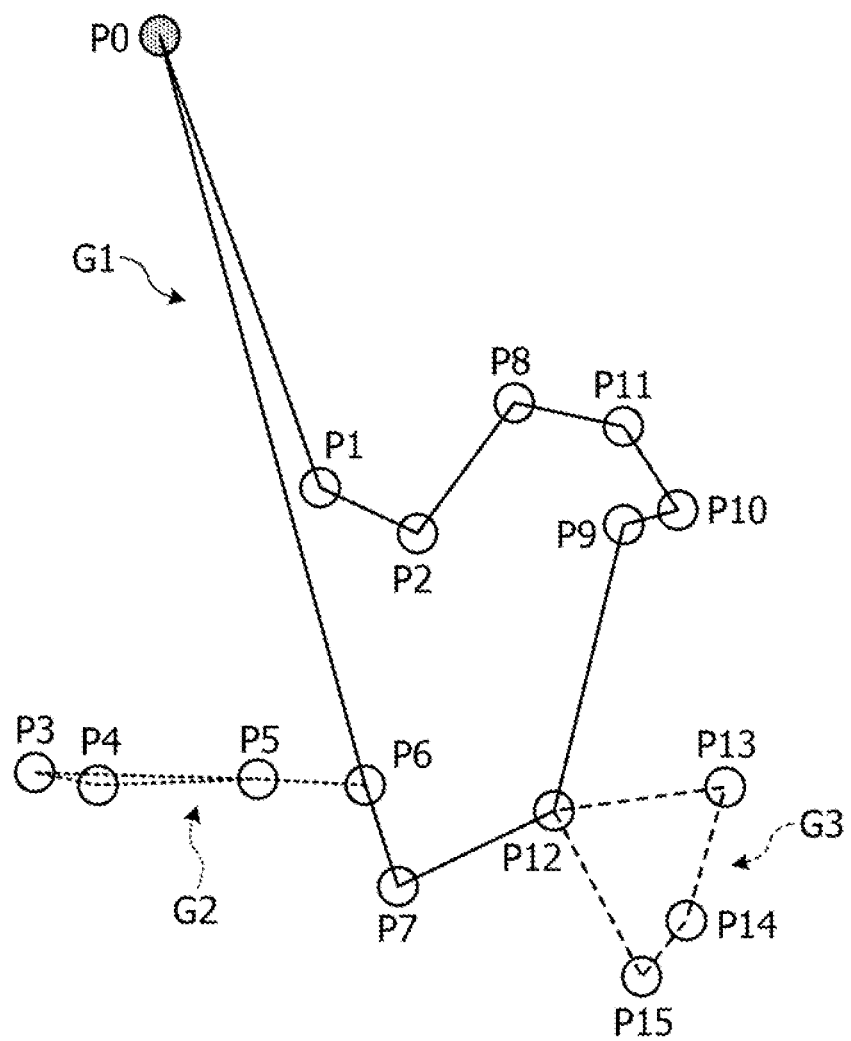
FIG. 6 is an explanatory diagram for explaining an example of a divided path problem.

FIG. 6 is an explanatory diagram for explaining an example of a divided path problem. As illustrated in FIG. 6, the information processing apparatus 1 creates the delivery plan after selecting relay points (demand points P6 and P12) and delivery destinations (demand points P6→P3 to P5 and demand points P12→P13 to P15) to which the goods are delivered via the relay points from among the plurality of delivery destinations (demand points P1 to P15). As a result, the information processing apparatus 1 creates the delivery plan by solving a path problem in which the demand points are divided into a group G2 of the demand points P6→P3 to P5, a group G3 of the demand points P12→P13 to P15, and a group G1 of the demand points (P1, P2, and P6 to P12) to which the goods are directly delivered from the supply point P0. Therefore, because the number of combinations when the path problem is solved is largely reduced, it is expected that the calculation cost is largely lowered.

Figure 7B:
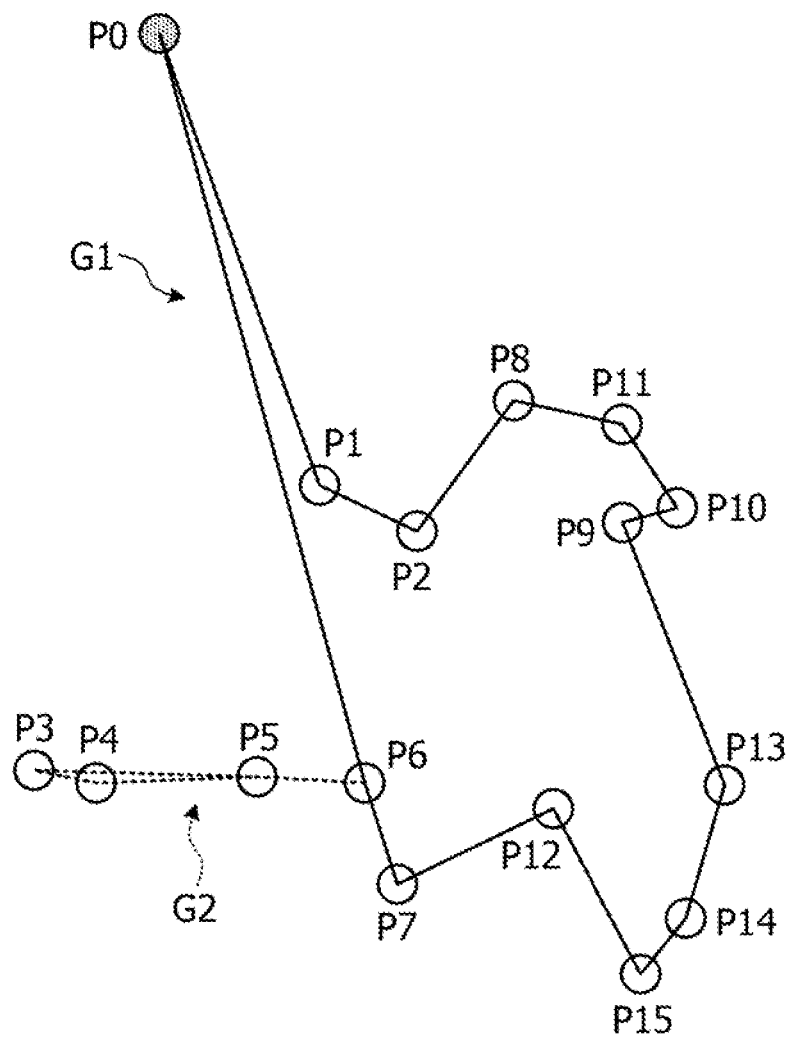
FIG. 7B is an explanatory diagram for explaining an example of the divided path problem.
Figure 8B:
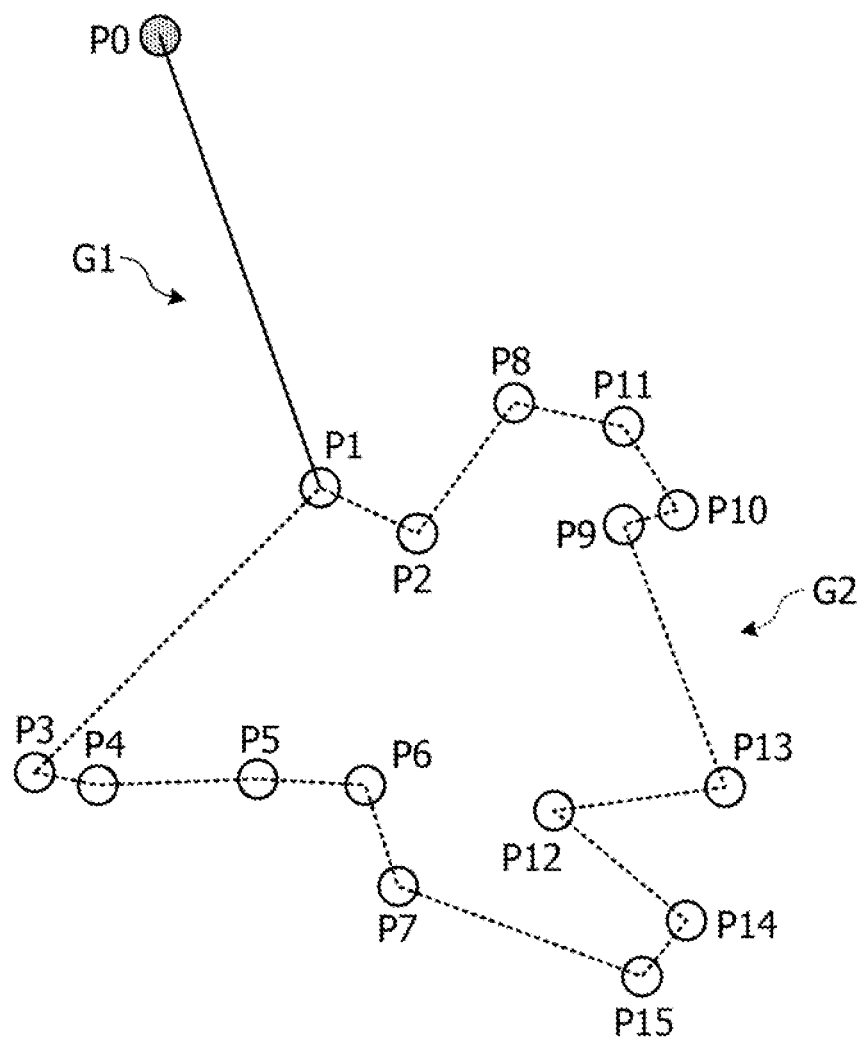
FIG. 8B is an explanatory diagram for explaining an example of the divided path problem.
Figure 9B:
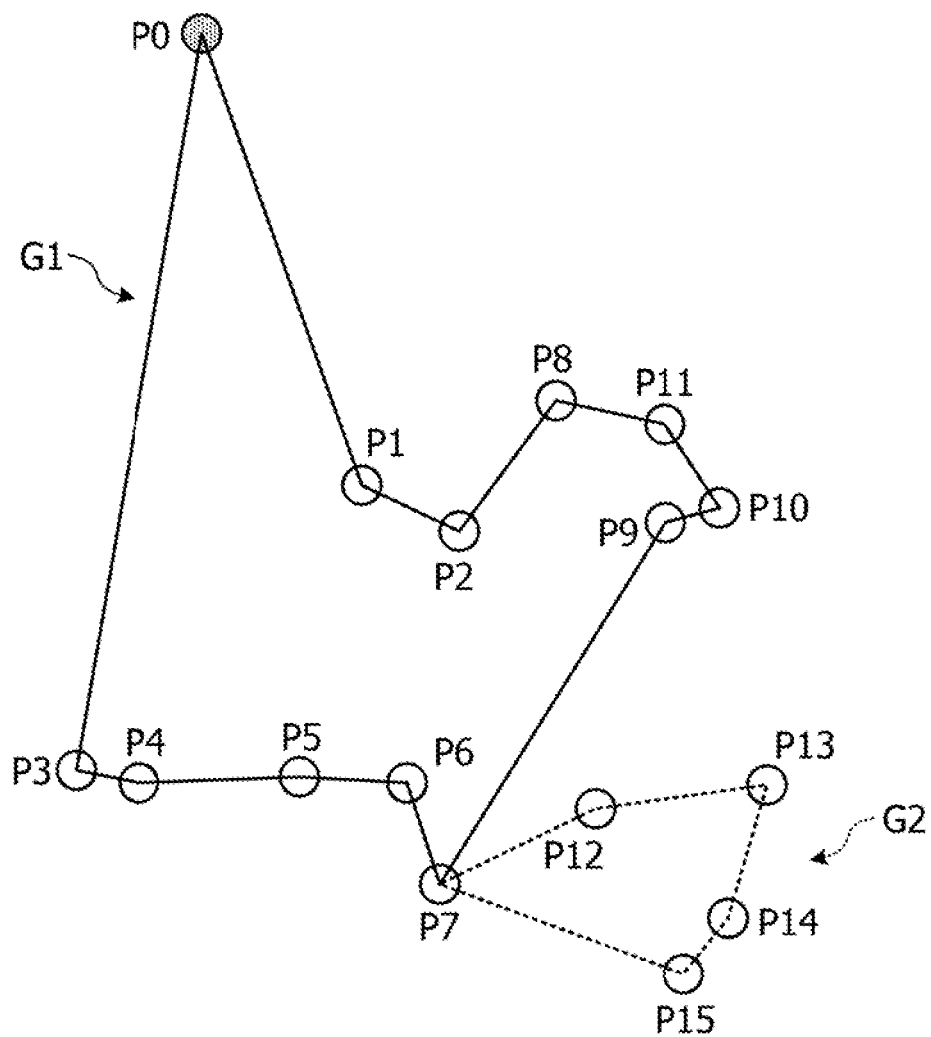
FIG. 9B is an explanatory diagram for explaining an example of the divided path problem.

FIGS. 7A, 8A, and 9A are diagrams for explaining examples of input data. FIGS. 7B, 8B, and 9B are explanatory diagrams for explaining examples of the divided path problem.

As an example, as illustrated in FIG. 7A, it is assumed that the demand amount for each point (supply point P0 and demand points P1 to P15), the truck size, the distance information indicating the distance between the points be input to the information processing apparatus 1 as input data D11 and D12 regarding conditions of the delivery plan. The information processing apparatus 1 creates a delivery plan on the basis of the input data D11 and D12.

At this time, as illustrated in FIG. 7B, the information processing apparatus 1 creates the delivery plan after selecting a relay point (demand point P6) and delivery destinations (demand points P6→P3 to P5) to which the goods are delivered via the relay point from among the plurality of delivery destinations (demand points P1 to P15). Specifically, for example, the information processing apparatus 1 creates a delivery plan by solving a path problem in which the demand points are divided into the group G2 of the demand points P6→P3 to P5 and the group G1 of the demand points (P1, P2, and P6 to P15) to which the goods are directly delivered from the supply point P0. As a result, the number of combinations when the path problem is solved is reduced from about 50 trillion combinations, which is the total number of combinations, to about 700 million combinations. Therefore, a calculation speed is expected to be about 70 thousand times faster.

Furthermore, as illustrated in FIG. 8A, it is assumed that the demand amount for each point (supply point P0 and demand points P1 to P15), the truck size, the distance information indicating the distance between the points be input to the information processing apparatus 1 as input data D21 and D22 regarding conditions of the delivery plan. The information processing apparatus 1 creates a delivery plan on the basis of the input data D21 and D22.

At this time, as illustrated in FIG. 8B, the information processing apparatus 1 creates a delivery plan after selecting a relay point (demand point P1) and delivery destinations (demand points P1→P2 to P15) to which the goods are delivered via the relay point from among the plurality of delivery destinations (demand points P1 to P15). Specifically, for example, the information processing apparatus 1 creates the delivery plan by solving a path problem in which the demand points are divided into the group G2 of the demand points P1→P2 to P15 and the group G1 of the demand point P1 to which the goods are directly delivered from the supply point P0. As a result, the number of combinations when the path problem is solved is reduced from about 50 trillion combinations, which is the total number of combinations, to about 40 billion combinations. Therefore, the calculation speed is expected to be about a thousand times faster.

Furthermore, as illustrated in FIG. 9A, it is assumed that the demand amount for each point (supply point P0 and demand points P1 to P15), the truck size, the distance information indicating the distance between the points be input to the information processing apparatus 1 as input data D31 and D32 regarding conditions of the delivery plan. The information processing apparatus 1 creates the delivery plan on the basis of the input data D31 and D32.

At this time, as illustrated in FIG. 9B, the information processing apparatus 1 creates a delivery plan after selecting a relay point (demand point P7) and delivery destinations (demand points P7→P12 to P15) to which the goods are delivered via the relay point from among the plurality of delivery destinations (demand points P1 to P15). Specifically, for example, the information processing apparatus 1 creates the delivery plan by solving a path problem in which the demand points are divided into the group G2 of the demand points P7→P12 to P15 and the group G1 of the demand points P1 to P11 to which the goods are directly delivered from the supply point P0. As a result, the number of combinations when the path problem is solved is reduced from about 50 trillion combinations, which is the total number of combinations, to about 200 million combinations. Therefore, the calculation speed is expected to be about 200 thousand times faster.

Furthermore, the relay point selection unit 33 selects a relay point and a delivery destination to which the goods are delivered via the relay point from among the candidates on the basis of the difference (C) between the first cost and the second cost that is obtained as indicated in the formula (1), for each of the candidates of the relay point and the candidates of the delivery destination to which the goods are delivered via the relay point, among the plurality of delivery destinations. With this selection, the information processing apparatus 1 can select the relay point and the delivery destination to which the goods are delivered via the relay point from among the candidates on the basis of the difference between the first cost and the second cost that is obtained by using the formula (1) described above while setting the truck size indicating the maximum allowable delivery amount per delivery as the upper limit.

Furthermore, the relay point selection unit 33 selects a relay point different from the relay point and a delivery destination to which the goods are delivered via the different relay point from among the delivery destinations excluding the delivery destination, to which the goods are delivered via the relay point, selected from among the plurality of delivery destinations. With this selection, the information processing apparatus 1 can create the delivery plan after selecting the plurality of relay points and the delivery destinations to which the goods are delivered via each of the plurality of relay points from among the plurality of delivery destinations. Furthermore, in a case where the delivery plan is created after the plurality of relay points and the delivery destinations to which the goods are delivered via each of the plurality of relay points, it is expected that the calculation cost when the optimization problem is solved at the time of creating the delivery plan is largely lowered than that in a case where the number of relay points is one.

Furthermore, the optimization problem processing unit 34 creates a delivery plan by solving the optimization problem in a case where the goods are delivered from the delivery source to the relay point and each of the delivery destinations to which the goods are delivered via the relay point and the optimization problem in a case where the goods are delivered from the delivery source to each of the delivery destinations to which the goods are delivered not via the relay point. In this way, regarding the information processing apparatus 1, by separately solving the optimization problems when the delivery plan for delivering the goods from the delivery source to the plurality of delivery destinations is created, it is expected that the calculation cost is largely lowered than that in a case where the single optimization problem for all the combinations is solved.

Note that the components of each of the illustrated devices are not necessarily and physically configured as illustrated in the drawings. In other words, for example, the specific aspects of separation and integration of each of the apparatus and devices are not limited to the illustrated aspects, and all or some of the apparatus or devices can be functionally or physically configured by being separated and integrated in any unit, in accordance with various loads, use status, and the like.

In addition, various processing functions executed with the information processing apparatus 1 may be entirely or optionally partially executed on a central processing unit (CPU) (or a microcomputer, such as a microprocessor unit (MPU) or a micro controller unit (MCU)). Furthermore, it is needless to say that whole or any part of various processing functions may be executed by a program to be analyzed and executed on a CPU (or microcomputer such as MPU or MCU), or on hardware by wired logic. In addition, various processing functions executed with the information processing apparatus 1 may be executed by a plurality of computers in cooperation with each other through cloud computing.

Figure 10:
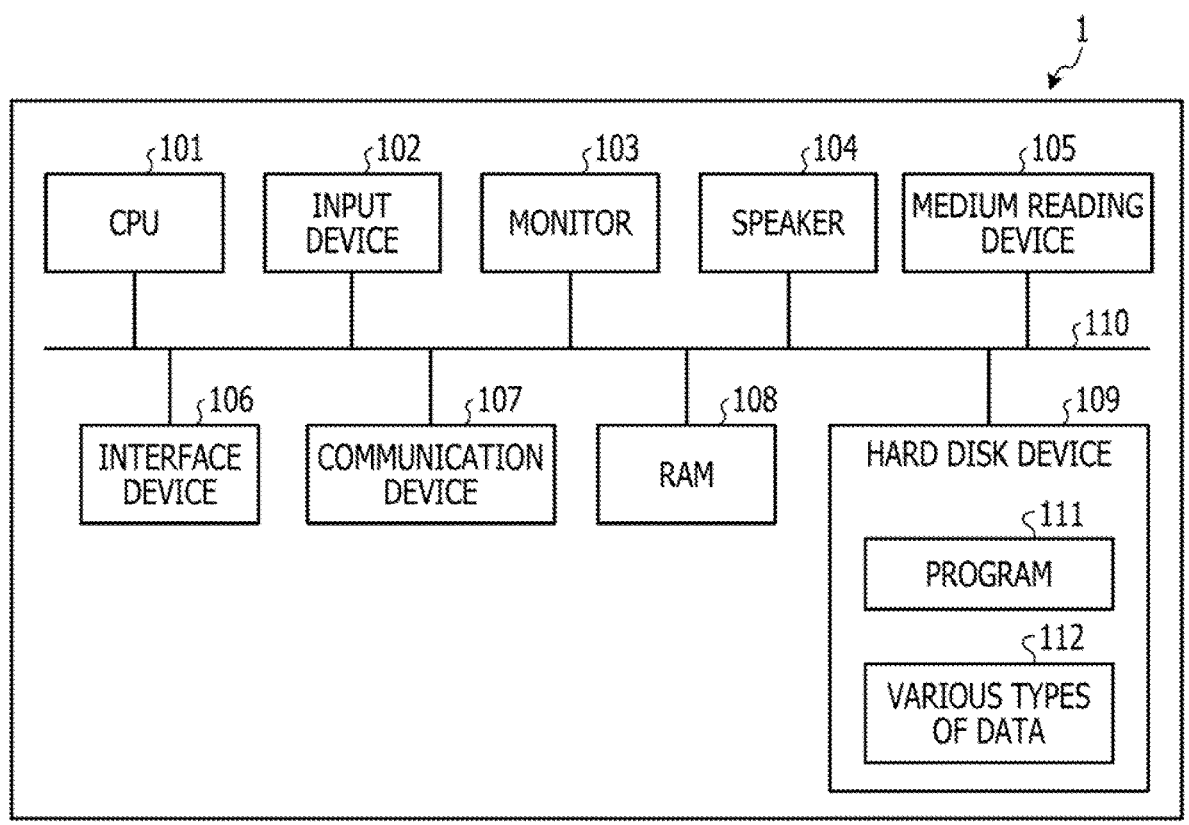
FIG. 10 is a block diagram illustrating an exemplary hardware configuration of the information processing apparatus according to the embodiment.

Meanwhile, the various processing described in the above embodiment can be achieved by execution of a prepared program on a computer. Thus, there will be described below an example of a computer (hardware) that executes a program having functions similar to the above embodiment. FIG. 10 is a block diagram illustrating an exemplary hardware configuration of the information processing apparatus 1 according to the embodiment.

As illustrated in FIG. 10, the information processing apparatus 1 includes a CPU 101 that executes various types of arithmetic processing, an input device 102 that receives data input, a monitor 103, and a speaker 104. In addition, the information processing apparatus 1 includes a medium reading device 105 that reads a program and the like from a storage medium, an interface device 106 that is used to connect to various devices, and a communication device 107 that makes communicative connection with an external device in a wired or wireless manner. Furthermore, the information processing apparatus 1 further includes a RAM 108 for temporarily storing various types of information, and a hard disk device 109. Furthermore, each unit (101 to 109) in the information processing apparatus 1 is connected to a bus 110.

The hard disk device 109 stores a program 111 used to execute various processing by the input reception unit 31, the combination processing unit 32, the relay point selection unit 33, the optimization problem processing unit 34, the output unit 35, or the like described in the above embodiment. In addition, the hard disk device 109 stores various types of data 112 to which the program 111 refers. The input device 102 receives, for example, an input of operation information from an operator. The monitor 103 displays, for example, various screens operated by the operator. The interface device 106 is connected to, for example, a printing device or the like. The communication device 107 is connected to a communication network such as a local area network (LAN), and exchanges various types of information with the external device via the communication network.

The CPU 101 reads the program 111 stored in the hard disk device 109 and develops and executes the program 111 on the RAM 108 so as to execute various processing regarding the input reception unit 31, the combination processing unit 32, the relay point selection unit 33, the optimization problem processing unit 34, the output unit 35, or the like. Note that, it is not needed for the program 111 to be stored in the hard disk device 109. For example, the program 111 that is stored in a storage medium that can be read by the information processing apparatus 1 may be read and executed. The storage medium which can be read by the information processing apparatus 1 corresponds to, for example, a portable recording medium such as a CD-ROM, a DVD disk, and a universal serial bus (USB) memory, a semiconductor memory such as a flash memory, a hard disk drive, and the like. Alternatively, the program 111 may be prestored in a device connected to a public line, the Internet, a LAN, or the like, and the information processing apparatus 1 may read the program 111 from the device to execute the program 111.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium for storing a delivery plan creation support program which causes a processor of a computer to perform processing, the computer being a computer of using an Ising machine to solve an optimization problem of a delivery cost, the processing comprising:

receiving, by the processor, input information from a memory of the computer, the memory being configured to store the input information that includes distance information for each pair of points including a delivery source and a plurality of delivery destinations to which goods are delivered from the delivery source, delivery amount information that indicates a total delivery amount of the goods to each of the plurality of delivery destinations, and maximum delivery amount information that indicates a maximum delivery amount per delivery, the distance information for each pair including information that indicates a distance between two points of the each pair;

generating, by the processor, a plurality of combinations by using the received input information, each of the plurality of combinations including a relay point candidate and a demand point group, the relay point candidate of the each of the plurality of combinations being any one of the plurality of delivery destinations, the demand point group of each of the plurality of combinations being a group including at least a part of the plurality of delivery destinations other than the relay point candidate of the each of the plurality of combinations;

calculating, by the processor, a first cost by using the received input information, the calculated first cost being a delivery cost to deliver the goods for the total delivery amount from the delivery source to each of the plurality of delivery destinations not via a first relay point while setting the maximum delivery amount indicated by the maximum delivery amount information as an upper limit;

calculating, by the processor, for each of the generated plurality of combinations, a second cost by using the received input information, the calculated second cost being a sum value of a delivery cost to deliver the goods for the total delivery amount from the delivery source to the relay point candidate of the each of the generated plurality of combinations and a delivery cost to deliver the goods for the total delivery amount from the first relay point of the each of the plurality of combinations to each of the delivery destinations included in the demand point group of the each of the generated plurality of combinations in a case where the maximum delivery amount indicated by the maximum delivery amount information is set as the upper limit and a predetermined delivery destination among the plurality of delivery destinations is set as the first relay point;

identifying, by the processor, for each of the generated plurality of combinations whether the calculated second cost is less than the calculated first cost;

in response to an event that the calculated second cost for any of the generated plurality of combinations is less than the calculated first cost, executing, by the processor, selection processing that includes:

selecting, by the processor, the relay point candidate of the each of the generated plurality of combinations as the first relay point, and selecting, by the processor, each of the delivery destinations included in the demand point group of the each of the generated plurality of combinations as a first delivery destination to which the goods are to be delivered via the selected first relay point; and creating, by the processor, a delivery plan for delivering the goods from the delivery source to the selected delivery destinations via the selected first relay point by causing the Ising machine to solve a divided path problem generated by using the selected first relay point and the selected delivery destinations, the selection processing is configured to select, from among the candidates, the first relay point and the first delivery destination based on a difference (C) between the first cost and the second cost, the difference being a value obtained by calculating, by the processor, a formula (1) as follows:

$$C = \sum_{i=S} D_{oi} \frac{P_i}{\min(T_0, T_i)} - \left( D_{or} \frac{\sum_{i=S} P_i}{\min(T_0, T_r)} + \sum_{i=S} D_{ri} \frac{P_i}{T_i} \right) \quad (1)$$

$$\begin{cases} D_{ij} = d_{ij}*2 + \text{a preset cost value } (CL) \\ T_i : \text{Maximum truck size that can be selected in warehouse } i \\ P_i : \text{total delivery amount to warehouse } i \\ d_{i,j} : \text{distance between warehouses } i \text{ and } j \text{ (However, 0 means departure point, } r \text{ means relay point)} \\ S: \text{ set of warehouses} \end{cases}$$

2. The non-transitory computer-readable storage medium according to claim 1, wherein the selection processing selects a second relay point different from the first relay point and a second delivery destination to which the goods are delivered via the first relay point from among delivery destinations excluding the first delivery destination, to which the goods are delivered via the first relay point, selected from among the plurality of delivery destinations.

3. The non-transitory computer-readable storage medium according to claim 1, wherein the creating processing creates the delivery plan by solving an optimization problem in a case where the goods are delivered from the delivery source to each of the selected first relay point and the selected delivery destinations to which the goods are delivered via the first relay point and an optimization problem in a case where the goods are delivered from the delivery source to each of the delivery destinations to which the goods are delivered not via the first relay point.

4. A method implemented by a computer of using an Ising machine to solve an optimization problem of a delivery cost, the method comprising:

receiving, by a processor of the computer, input information from a memory of the computer, the memory being configured to store the input information that includes distance information for each pair of points including a delivery source and a plurality of delivery destinations to which goods are delivered from the delivery source, delivery amount information that indicates a total delivery amount of the goods to each of the plurality of delivery destinations, and maximum delivery amount information that indicates a maximum delivery amount per delivery, the distance information for each pair including information that indicates a distance between two points of the each pair;

generating, by the processor, a plurality of combinations by using the received input information, each of the plurality of combinations including a relay point candidate and a demand point group, the relay point candidate of each of the plurality of combinations being any one of the plurality of delivery destinations, the demand point group of each of the plurality of combinations being a group including at least a part of the plurality of delivery destinations other than the relay point candidate of the each of the plurality of combinations;

calculating, by the processor, a first cost by using the received input information, the calculated first cost being a delivery cost to deliver the goods for the total delivery amount from the delivery source to each of the plurality of delivery destinations not via a first relay point while setting the maximum delivery amount indicated by the maximum delivery amount information as an upper limit;

calculating, by the processor, for each of the generated plurality of combinations, a second cost by using the received input information, the calculated second cost being a sum value of a delivery cost to deliver the goods for the total delivery amount from the delivery source to the relay point candidate of the each of the generated plurality of combinations and a delivery cost to deliver the goods for the total delivery amount from the first relay point of the each of the generated plurality of combinations to each of the delivery destinations included in the demand point group of the each of the generated plurality of combinations in a case where the maximum delivery amount indicated by the maximum delivery amount information is set as the upper limit and a predetermined delivery destination among the plurality of delivery destinations is set as the first relay point;

identifying, by the processor, for each of the generated plurality of combinations whether the calculated second cost is less than the calculated first cost;

in response to an event that the calculated second cost for any of the generated plurality of combinations is less than the calculated first cost, executing, by the processor, selection processing that includes:
  selecting, by the processor, the relay point candidate of the each of the generated plurality of combinations as the first relay point, and
  selecting, by the processor, each of the delivery destinations included in the demand point group of the each of the generated plurality of combinations as a first delivery destination to which the goods are to be delivered via the selected first relay point; and
creating, by the processor, a delivery plan for delivering the goods from the delivery source to the selected delivery destinations via the selected first relay point by causing the Ising machine to solve a divided path problem generated by using the selected first relay point and the selected delivery destinations,
the selection processing is configured to select, from among the candidates, the first relay point and the first delivery destination based on a difference (C) between the first cost and the second cost, the difference being a value obtained by calculating, by the processor, a formula (1) as follows:

$$C = \sum_{i=S} D_{oi} \frac{P_i}{\min(T_0, T_i)} - \left( D_{or} \frac{\sum_{i=S} P_i}{\min(T_0, T_r)} + \sum_{i=S} D_{ri} \frac{P_i}{T_i} \right) \quad (1)$$

$$\begin{cases} D_{ij} = d_{ij}*2 + \text{a preset cost value } (CL) \\ T_i : \text{Maximum truck size that can be selected in warehouse } i \\ P_i : \text{total delivery amount to warehouse } i \\ d_{i,j} : \text{distance between warehouses } i \text{ and } j \text{ (However, 0 means departure point, } r \text{ means relay point)} \\ S: \text{ set of warehouses} \end{cases}$$

5. The method according to claim 4, wherein the selection processing selects a second relay point different from the first relay point and a second delivery destination to which the goods are delivered via the first relay point from among delivery destinations excluding the first delivery destination, to which the goods are delivered via the first relay point, selected from among the plurality of delivery destinations.

6. The method according to claim 4, wherein the creating processing creates the delivery plan by solving an optimization problem in a case where the goods are delivered from the delivery source to each of the selected first relay point and the selected delivery destinations to which the goods are delivered via the first relay point and an optimization problem in a case where the goods are delivered from the delivery source to each of the delivery destinations to which the goods are delivered not via the first relay point.

7. An information processing apparatus of using an Ising machine to solve an optimization problem of a delivery cost, the information processing apparatus comprising:
  a memory; and
  a processor coupled to the memory, the processor being configured to perform processing, the processing including:
    receiving, by the processor, input information from a memory of the computer, the memory being configured to store the input information that includes distance information, delivery amount information that indicates a total delivery amount of the goods to each of the plurality of delivery destinations, and maximum delivery amount information that indicates a maximum delivery amount per delivery, the distance information for each pair including information that indicates a distance between two points of the each pair;
    generating, by the processor, a plurality of combinations by using the received input information, each of the combinations including a relay point candidate and a demand point group, the relay point candidate of the each of the plurality of combinations being any one of the plurality of delivery destinations, the demand point group of each of the plurality of combinations being a group including at least a part of the plurality of delivery destinations other than the relay point candidate of the each of the plurality of combinations;
    calculating, by the processor, a first cost by using the received input information, the calculated first cost being a delivery cost to deliver the goods for the total delivery amount from the delivery source to each of the plurality of delivery destinations not via a first relay point while setting the maximum delivery amount indicated by the maximum delivery amount information as an upper limit;
    calculating, by the processor, for each of the generated plurality of combinations, a second cost by using the received input information, the calculated second cost being a sum value of a delivery cost to deliver the goods for the total delivery amount from the delivery source to the relay point candidate of the each of the generated plurality of combinations and a delivery cost to deliver the goods for the total delivery mount from the first relay point of the each of the generated plurality of combinations to each of the delivery destinations included in the demand point group of the each of the generated plurality of combinations in a case where the maximum delivery amount indicated by the maximum delivery amount information is set as the upper limit and a predetermined delivery destination among the plurality of delivery destinations is set as the first relay point;
    identifying, by the processor, for each of the generated plurality of combinations whether the calculated second cost is less than the calculated first cost;
    in response to an event that the calculated second cost for any of the generated plurality of combinations is less than the calculated first cost, executing, by the processor, selection processing that includes:
      selecting, by the processor, the relay point candidate of the each of the generated plurality of combinations as the relay point, and
      selecting, by the processor, each of the delivery destinations included in the demand point group of the each of the generated plurality of combinations as a first delivery destination to which the goods are to be delivered via the selected first relay point; and
    creating, by the processor, a delivery plan for delivering the goods from the delivery source to the selected delivery destinations via the selected first relay point by causing the Ising machine to solve a divided path problem generated by using the selected first relay point and the selected delivery destinations,
    the selection processing is configured to select, from among the candidates, the first relay point and the first delivery destination based on a difference (C) between the first cost and the second cost, the difference being a value obtained by calculating, by the processor, a formula (1) as follows:

$$C = \sum_{i=S} D_{oi} \frac{P_i}{\min(T_0, T_i)} - \left( D_{or} \frac{\sum_{i=S} P_i}{\min(T_0, T_r)} + \sum_{i=S} D_{ri} \frac{P_i}{T_i} \right) \quad (1)$$

$$\begin{cases} D_{ij} = d_{ij}{}^*2 + \text{a preset cost value } (CL) \\ T_i : \text{Maximum truck size that can be selected in warehouse } i \\ P_i : \text{total delivery amount to warehouse } i \\ d_{i,j} : \text{distance between warehouses } i \text{ and } j \text{ (However, 0 means} \\ \text{departure point, } r \text{ means relay point)} \\ S: \text{ set of warehouses} \end{cases}.$$

8. The information processing apparatus according to claim 7, wherein the selection processing selects a second relay point different from the first relay point and a second delivery destination to which the goods are delivered via the first relay point from among delivery destinations excluding the first delivery destination, to which the goods are delivered via the first relay point, selected from among the plurality of delivery destinations.

9. The information processing apparatus according to claim 7, wherein the creating processing creates the delivery plan by solving an optimization problem in a case where the goods are delivered from the delivery source to each of the selected first relay point and the selected delivery destinations to which the goods are delivered via the first relay point and an optimization problem in a case where the goods are delivered from the delivery source to each of the delivery destinations to which the goods are delivered not via the first relay point.

* * * * *